(12) United States Patent
Kester et al.

(10) Patent No.: US 8,638,537 B2
(45) Date of Patent: Jan. 28, 2014

(54) LINE PROTECTION SYSTEMS

(75) Inventors: Jeffrey J. Kester, Bemus Point, NY (US); Charles W. Daley, Olean, NY (US); James A. Strong, Olean, NY (US)

(73) Assignee: Cooper Technologies Company, Houston, TX (US)

( * ) Notice: Subject to any disclaimer, the term of this patent is extended or adjusted under 35 U.S.C. 154(b) by 351 days.

(21) Appl. No.: 13/043,369

(22) Filed: Mar. 8, 2011

(65) Prior Publication Data

US 2011/0216463 A1    Sep. 8, 2011

Related U.S. Application Data

(60) Provisional application No. 61/311,458, filed on Mar. 8, 2010.

(51) Int. Cl.
*H02H 1/04* (2006.01)
(52) U.S. Cl.
USPC .......................................................... 361/118
(58) Field of Classification Search
USPC .......................................................... 361/118
See application file for complete search history.

(56) References Cited

U.S. PATENT DOCUMENTS

| | | | |
|---|---|---|---|
| 3,596,939 A | | 8/1971 | Gibson |
| 4,101,114 A | * | 7/1978 | Martin et al. ........ 254/134.3 FT |
| 4,487,641 A | | 12/1984 | Bohannon, Jr. et al. |
| 4,843,354 A | | 6/1989 | Fuller et al. |
| 5,400,207 A | | 3/1995 | Krause |
| 6,683,267 B1 | * | 1/2004 | Piazza et al. ...................... 218/2 |
| 2006/0290476 A1 | | 12/2006 | Zitting et al. |
| 2009/0213518 A1 | | 8/2009 | Domejean et al. |

OTHER PUBLICATIONS

International Search Report, Written Opinion and Search History for Related International Application No. PCT/US2011/0027477, Mailed Apr. 27, 2011 (11 pages).

* cited by examiner

*Primary Examiner* — Rexford Barnie
*Assistant Examiner* — Tien Mai
(74) *Attorney, Agent, or Firm* — King & Spalding LLP

(57) ABSTRACT

A line protection system described herein provides reliable electro-mechanical connections between system components, reduces mechanical stresses on a disconnector, assures more effective disconnection of a failed arrestor, and is lower in cost than existing systems. The line protection system includes a surge arrestor, a disconnector coupled to the surge arrestor, and a line lead coupled to the disconnector. The line lead generally is a high strength cable and/or the line protection system generally does not include a shunt bypass assembly. Upon exposure to a high voltage condition, the disconnector actuates and separates the line lead from the system.

20 Claims, 9 Drawing Sheets

LINE PROTECTION SYSTEMS

CROSS-REFERENCE TO RELATED APPLICATION

The present application claims priority under 35 U.S.C. §119(e) to U.S. Provisional Patent Application No. 61/311,458, titled "Line Protection Systems" filed on Mar. 8, 2010, the entire disclosure of which is hereby fully incorporated herein by reference.

TECHNICAL FIELD

The present invention relates to an assembly of a disconnector, a surge arrestor, and an insulator for connecting a power distribution or transmission line to ground. More particularly, the present invention involves distribution or transmission line protection systems having two disconnectors in series, a high strength stainless steel line lead, and/or conductive connectors that reduce mechanical stresses on the system and/or allow reliable electro-mechanical connections.

BACKGROUND OF THE INVENTION

Power distribution or transmission lines are typically suspended from towers by insulators, which serve to electrically insulate line voltage from ground, and additionally prevent electrical power current from flowing from the distribution or transmission line to the supporting tower. Transient overvoltage conditions caused by current flows may lead to insulator flashover, resulting in a system outage and potential damage to the insulator and conductors.

To reduce or eliminate insulator flashover, a surge arrestor is typically used in parallel with an insulator. Surge arrestors are typically connected to power distribution or transmission lines to carry electrical surge currents to ground, and thus, prevent damage to the lines, as well as the equipment connected thereto. Surge arrestors generally offer high resistance to normal voltage across distribution or transmission lines, and provide very low resistance to surge currents produced by sudden high voltage conditions, such as those caused by a lightning strike, and thereby reduce the risk of insulator flashover during surge events. After the surge currents cease, the voltage drops and the surge arrestor returns to a high resistance condition. However, in certain cases when the surge arrestor fails, the high resistance condition is not resumed, and the surge arrestor continues to provide an electrical path from the distribution or transmission line to the ground. As a result of arrestor failure, the distribution or transmission line will lockout.

Disconnectors (or disconnecting devices) are commonly used in combination with the surge arrestors to separate failed surge arrestors from the circuit. The surge arrester/disconnector assembly is connected in parallel with the insulator. In certain arrangements, the surge arrestor is connected to the distribution or transmission line by a copper or aluminum line lead, a disconnector, and a number of moving, wearable connections between the components which include shunt bypass assemblies that provide solid, partial discharge free electrical contact around the associated moveable, wearable connections. The disconnectors provide a visual indication of surge arrestor failure upon actuation of the disconnectors. The disconnectors have an explosive charge to physically separate the terminals of the disconnector when actuated. Operation of the disconnector effectively removes the failed arrester from the circuit. Once the fault has been cleared, the power system circuit can be reenergized without the failed arrester in the circuit. In some cases, upon actuation of the disconnector, the line lead, which is still connected to ground, swings uncontrollably unless weights, such as chains, are attached so that the line lead falls to a safe location to prevent unintentional short circuits from accidentally coming in contact with a conductor. However, the weights on the line lead provide added mechanical stresses on the disconnector, as well as added costs due to added components.

Therefore, a need exist in the art for an improved line protection system that provides more reliable electro-mechanical connections between system components, reduces mechanical stresses on the disconnector, assures more effective disconnection of a failed arrestor, and is lower in cost than existing systems.

SUMMARY OF THE INVENTION

The present invention provides a line protection system that is safer, more reliable, and lower in cost than existing systems.

In one aspect of the invention, a line protection system can include a surge arrestor, a line lead, and two disconnectors. One of the disconnectors can be coupled to the surge arrestor and a first end of the line lead, while the other disconnector can be coupled to a second end of the line lead. When the system is exposed to a high voltage condition, the surge arrestor can fail, and thereby cause the line lead to separate at both of the disconnectors. The line lead can then fall to the ground.

In another aspect, a line protection system can include a surge arrestor, a disconnector, and a line lead. The disconnector can be coupled to the surge arrestor and the line lead. The line lead can include a high strength cable. The line protection system does not include a shunt bypass assembly.

In yet another aspect, a line protection system can include a surge arrestor, a disconnector coupled to the surge arrestor by a conductive connector, and a line lead coupled to the disconnector by another conductive connector. The conductive connector can be a ball swage and shackle connector, a threaded swage connector, or a pad swage connector. The line protection system can be without a shunt bypass assembly.

These and other aspects, objects, features, and embodiments of the present invention will become apparent to those having ordinary skill in the art upon consideration of the following detailed description of illustrative embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings, which are described below.

Figure 1A:
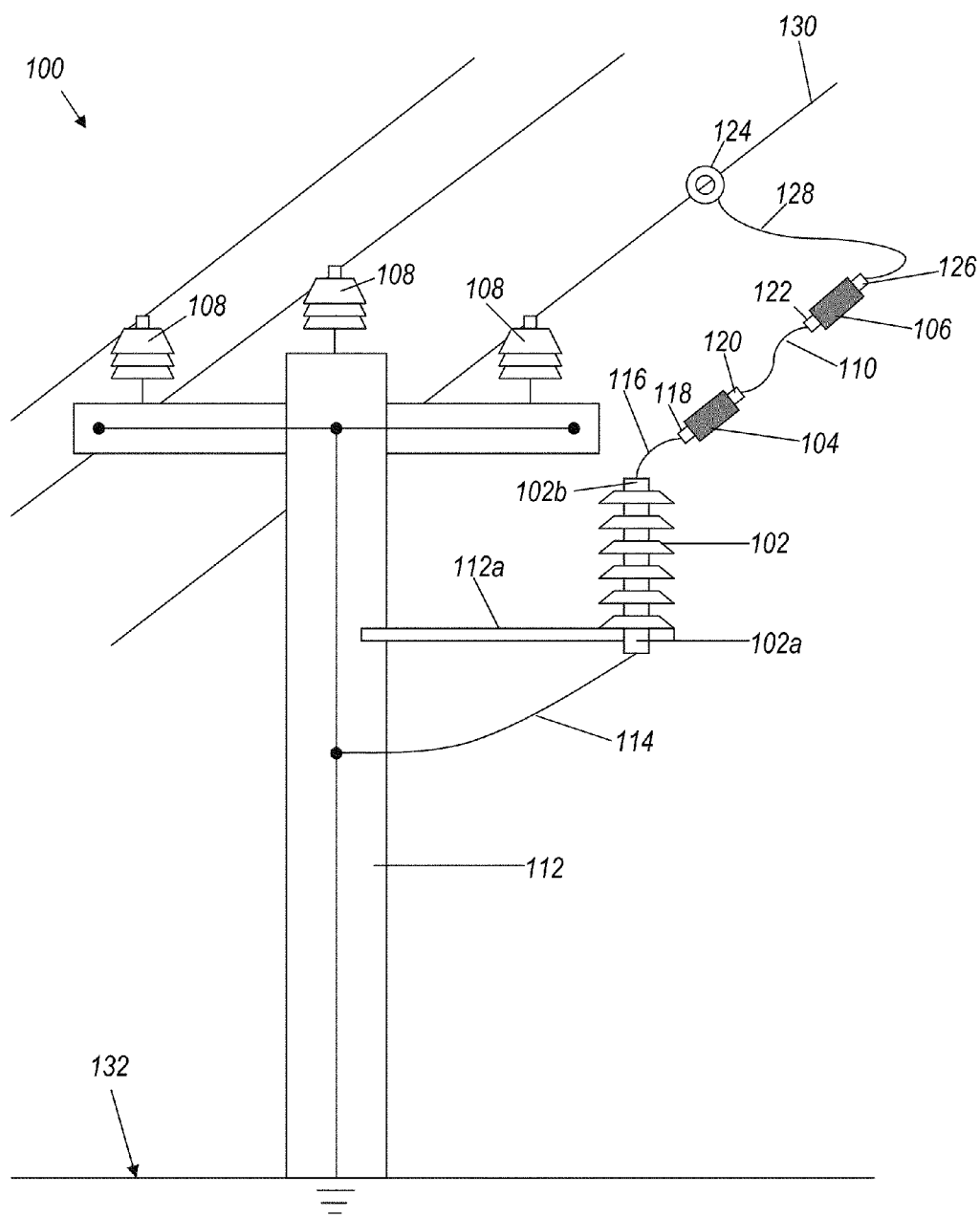
FIG. 1A is a perspective view of a line protection system for power distribution, according to an exemplary embodiment.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION OF THE INVENTION

A line protection system described herein generally includes a surge arrestor, at least one disconnector, at least one conductive connector, and at least one line lead. In some embodiments, two disconnectors may be used in conjunction with a high strength stainless steel line lead. Generally, the line protection systems of the present invention create more reliable electro-mechanical connections between system components, thereby providing greater longevity than existing line protection systems in the market. The benefits of the line protection system of the present invention are to reduce the mechanical stresses on the disconnector, and eliminate the number of troublesome moving, wearable connections having shunt bypass assemblies that are common in existing designs.

The invention may be better understood by reading the following description of non-limiting, exemplary embodiments with reference to the attached drawings wherein like parts of each of the figures are identified by the same reference characters.

Figure 1B:
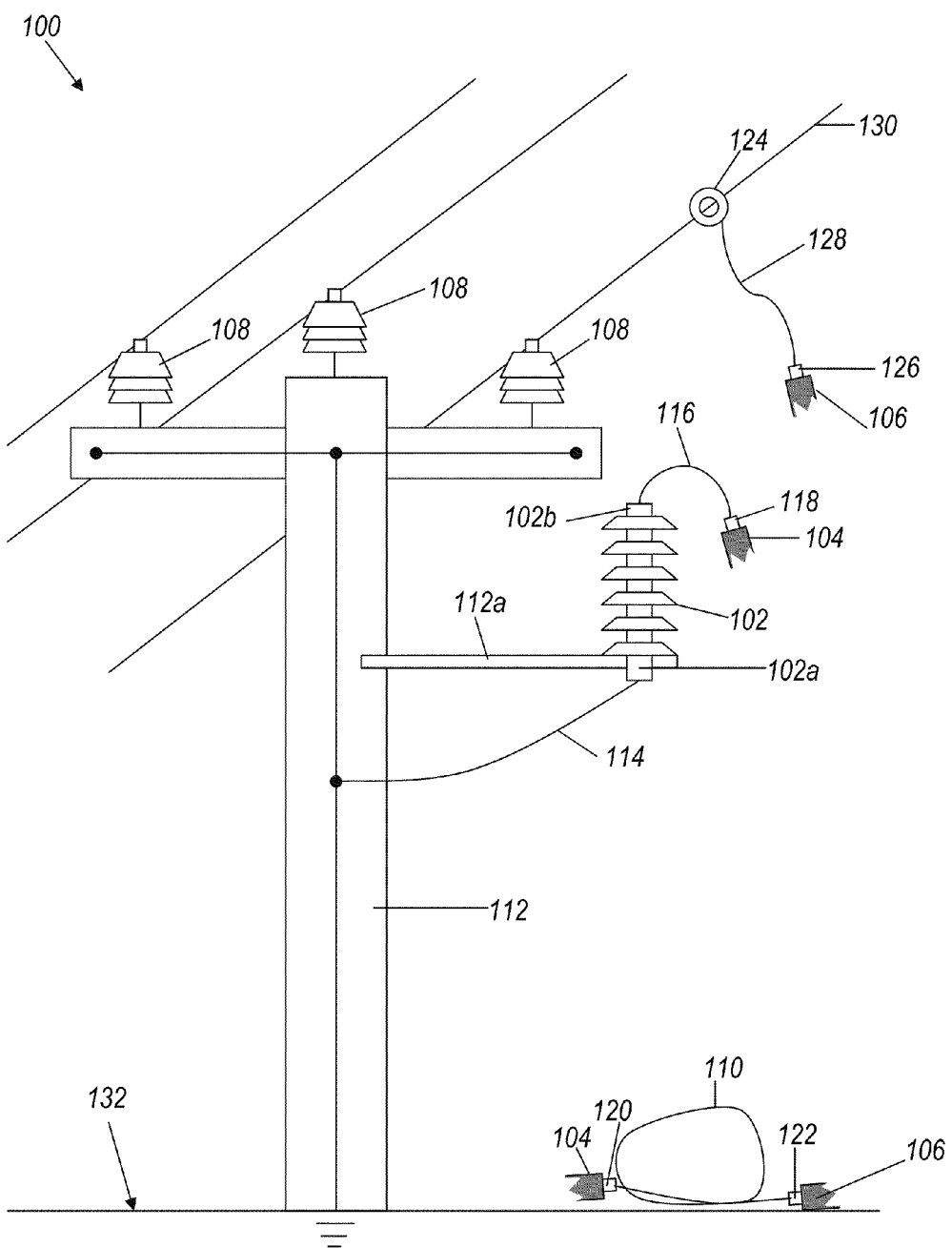
FIG. 1B is a perspective view of the line protection system of FIG. 1A, after system failure, according to an exemplary embodiment.

FIG. 1A is a perspective view of a line protection system for power distribution application 100, according to an exemplary embodiment. FIG. 1B is a perspective view of a line protection system for power distribution application 100 after system failure, according to an exemplary embodiment. The line protection system for power distribution application 100 includes a surge arrestor 102, disconnectors 104, 106, insulators 108, and a line lead 110. The surge arrestor 102 can be any surge arrestor suitable for use with a transmission or distribution line. The surge arrestor 102 is coupled to a utility structure 112 by an insulating hanger 112a. In certain embodiments, the utility structure 112 is a pole or a tower. A bottom end 102a of the surge arrestor 102 is coupled to a ground lead 114 that is connected to ground. A top end 102b of the surge arrestor 102 is coupled to the disconnector 104 by a cable 116 and a conductive connector 118. The disconnector 104 is coupled to the line lead 110 by a conductive connector 120, which is also coupled to the disconnector 106 by a conductive connector 122. The disconnector 106 is coupled to a line clamp 124 by a conductive connector 126 and a cable 128, and the line clamp 124 is connected to a distribution line 130. The distribution line 130 is coupled to an insulator 108 that is coupled to the structure 112. In certain embodiments, the insulator 108 is a pin insulator. Referring to FIG. 1B, when a high voltage condition occurs, such as a lightning strike, the disconnectors 104, 106 are actuated and separate. As a result, the line lead 110 is separated from the system for power distribution 100 and coils upon itself, and falls to the surface 132 below.

The disconnectors 104, 106 can be any disconnecting device suitable for use with a surge arrestor. Suitable disconnectors include disconnectors having cartridge detonators or potassium chlorate detonators.

The line lead 110 is preferably made from a material, such as a high strength stainless steel cable, that is able to coil into a circle upon disconnection from the disconnectors 104, 106. Suitable cables for line leads include high strength cable assemblies having a tensile strength of greater than about 2500 pounds per square inch. The line lead 110 can be of any length. In certain exemplary embodiments, the length of the line lead 110 is from about six feet to about ten feet. In other exemplary embodiments, the length of the line lead 110 is about twenty feet. In certain alternative embodiments, the line lead 110 is constructed of stranded copper or aluminum.

The connectors 118, 120, 122, and 126 can be any suitable conductive connector for coupling a cable to a disconnector. Examples of suitable connectors include, but are not limited to, ball swage and shackle connectors, threaded swage connectors, and pad swage connectors. The connectors 118, 120, 122, and 126 may be constructed from any conductive material, such as stainless steel, brass, copper, and aluminum. The inclusion of the connectors 118, 120, 122, and 126 allows for the application of an axial load across the disconnectors 104, 106, and helps prevent premature failures that result from sheer loads from conventional methods. Suitable connectors are described in further detail with respect to FIG. 2-5.

Figure 2:
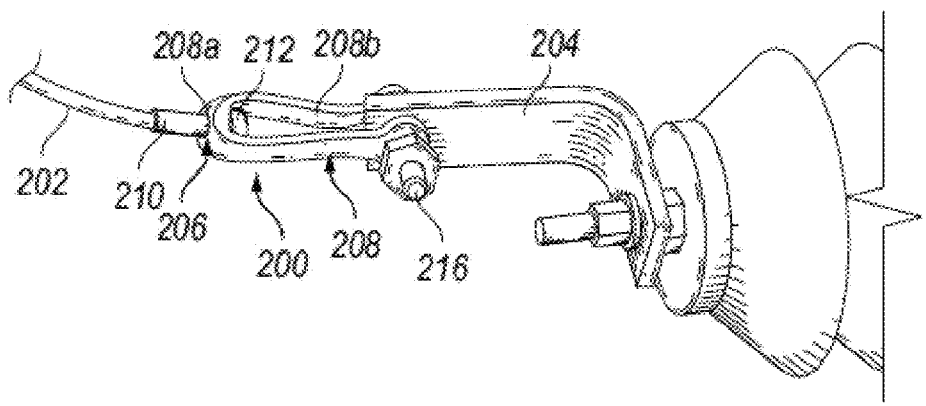
FIG. 2 is a perspective view of a ball swage and shackle connector, coupled to a cable and a mounting bracket, according to an exemplary embodiment.

FIG. 2 is a perspective view of a conductive ball swage and shackle connector 200 coupled to a cable 202 and a mounting bracket 204, according to an exemplary embodiment. The connector 200 includes a ball swage portion 206 and a shackle portion 208. The ball swage portion 206 includes a clearance set sleeve 210 that the cable 202 is inserted into. The sleeve 210 is compressed into strands of the cable 202 to create a mechanical bond that secures the connector 200 to the cable 202. In certain exemplary embodiments, the sleeve 210 is crimped to the cable 202. The ball swage portion 206 also includes spherical-shaped portion 212 coupled to the sleeve 210. The shackle portion 208 is generally U-shaped or horseshoe-shaped with a base 208a and two parallel extensions 208b extending orthogonally therefrom. The spherical-shaped portion 212 of the ball swage portion 206 is positioned at the base 208a of the shackle portion 208, and the sleeve 210 extends through an opening (not shown) in the base 208a in a direction away from the extensions 208b. In certain exemplary embodiments, the spherical-shaped portion 212 is rotatable within the opening in the base 208a for a movable connection, thus allowing for untwisting of the cable 202 as needed and stress release. The mounting bracket 204 is positioned between the extensions 208b, and each of the extensions 208b includes an opening (not shown) at an end thereof for receiving a securing mechanism 216 for securing the extensions 208b to the mounting bracket 204.

Figure 3:
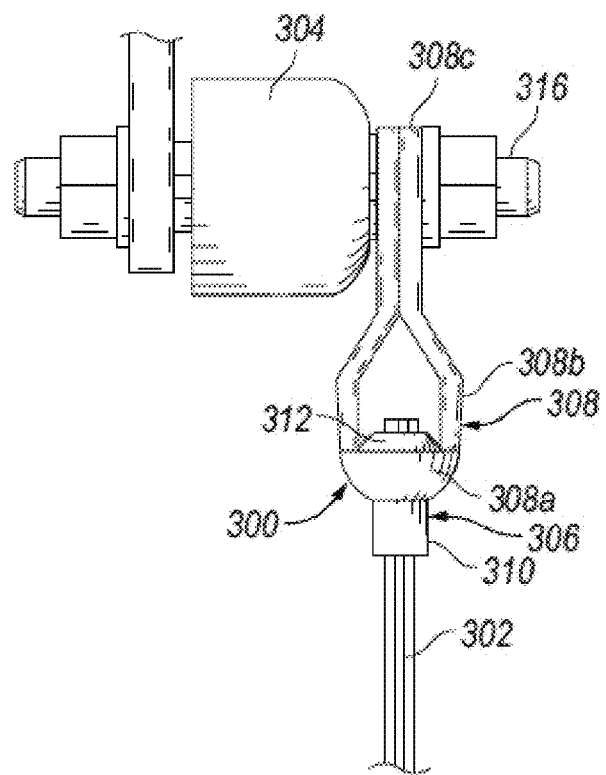
FIG. 3 is a side view of another ball swage and shackle connector, coupled to a cable and a disconnector, according to an exemplary embodiment.

FIG. 3 is a side view of a conductive ball swage and shackle connector 300 coupled to a cable 302 and a disconnector 304, according to an exemplary embodiment. The connector 300 includes a ball swage portion 306 and a shackle portion 308. The ball swage portion 306 includes a clearance set sleeve 310 that the cable 302 is inserted into. The sleeve 310 is similar to the sleeve 210, and secures the connector 300 to the cable 302. The ball swage portion 306 also includes spherical-shaped portion 312 coupled to the sleeve 310. The shackle portion 308 is generally U-shaped or horseshoe-shaped with a base 308a and two parallel extensions 308b extending orthogonally therefrom. In certain embodiments, ends 308c of the extensions 308b angle towards each other, and are in contact with one another. The spherical-shaped portion 312 of the ball swage portion 306 is positioned at the base 308a of the shackle portion 308, and the sleeve 310 extends through an opening (not shown) in the base 308a in a direction away from the extensions 308b. In certain exemplary embodiments, the spherical-shaped portion 312 is rotatable within the opening in the base 308a for a movable connection, thus allowing for untwisting of the cable 302 as needed and stress release. Each of the ends 308c includes an opening (not shown) for receiving a securing mechanism, such as bolt 316 for securing the ends 308c to the disconnector 304.

Figure 4A:
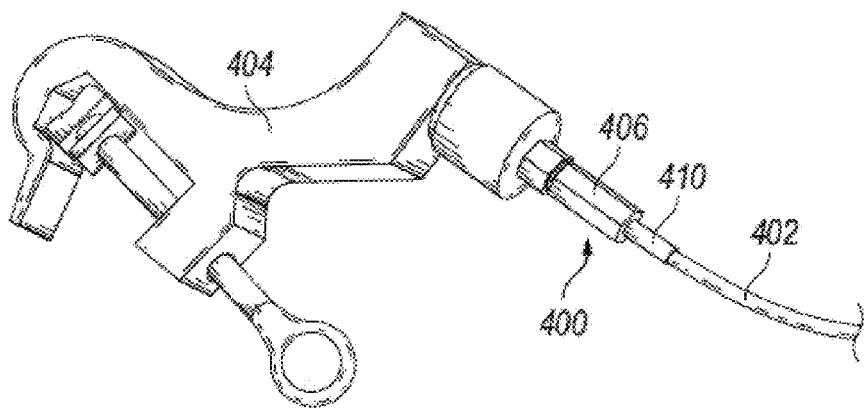
FIG. 4A is a perspective view of a threaded swage connector, coupled to a cable and a line tap, according to an exemplary embodiment.

FIG. 4A is a perspective view of a conductive threaded swage connector 400 coupled to a cable 402 and a line tap 404 for connecting to a transmission line (not shown), according to an exemplary embodiment. The connector 400 includes a cylindrical portion 406 and a clearance set sleeve 410. The sleeve 410 is similar to the sleeve 210, and secures the connector 400 to the cable 402. The cylindrical portion 406 includes a cavity (not shown) having female threads (not shown) therein. The female threads mate with corresponding male threads (not shown) on the line tap 404 to secure the line tap 404 to the connector 400.

Figure 4B:
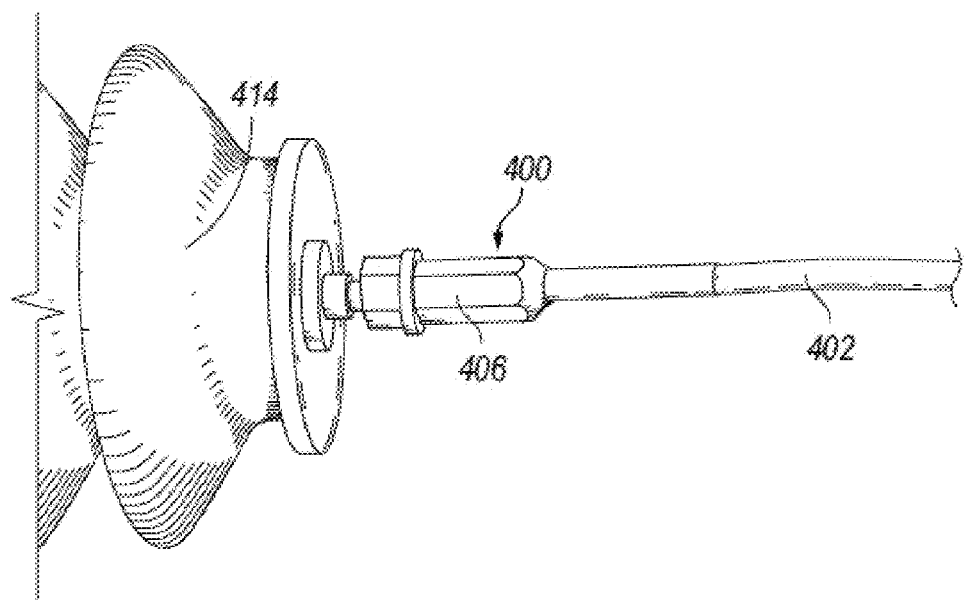
FIG. 4B is a perspective view of the threaded swage connector of FIG. 4A, coupled to a cable and a surge arrestor, according to another exemplary embodiment.

FIG. 4B is a perspective view of the conductive threaded swage connector 400 coupled to the cable 402 and a surge arrestor 414, according to an exemplary embodiment. The cylindrical portion 406 of the connector 400 includes female threads therein for mating with corresponding male threads (not shown) on the surge arrestor 414, and thus securing the connector 400 to the surge arrestor 414.

Figure 5:
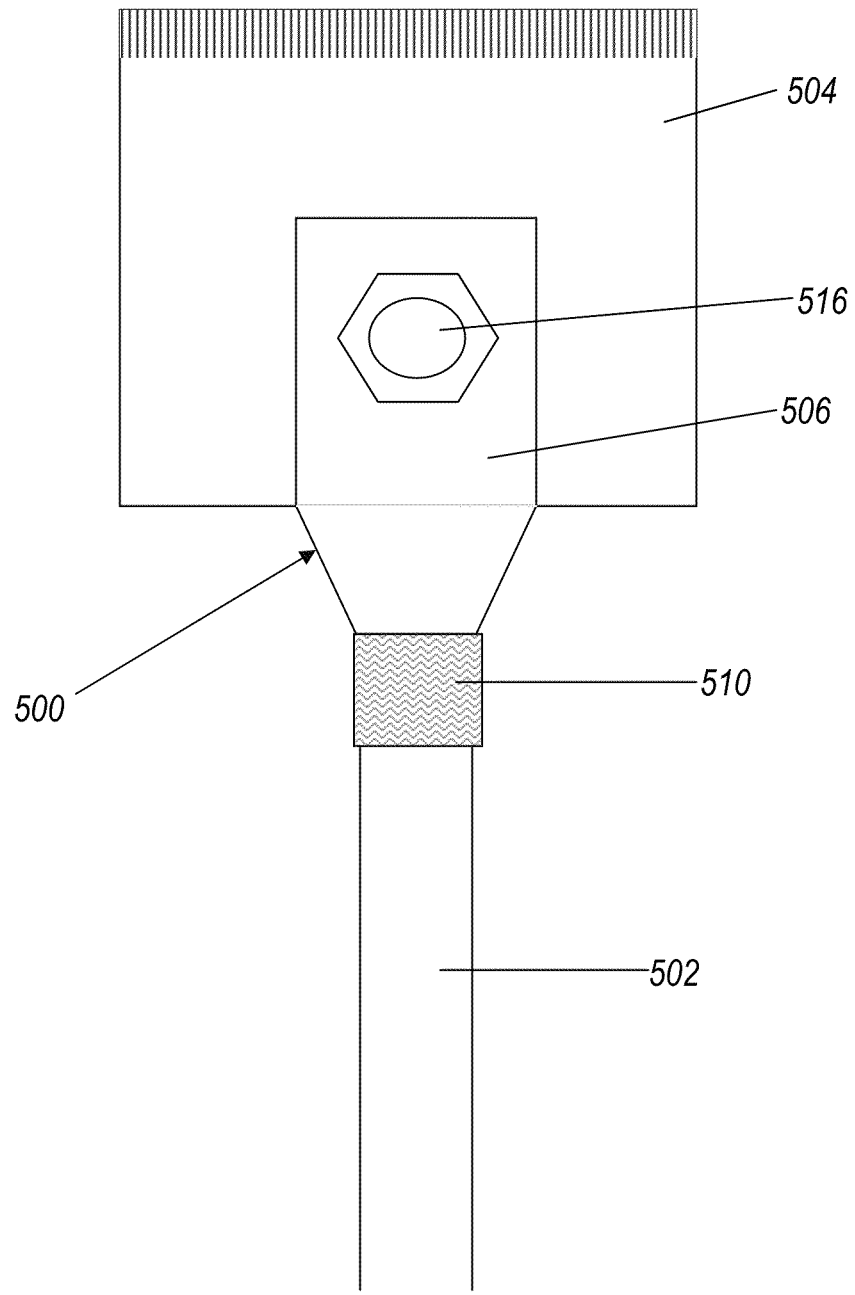
FIG. 5 is a front view of a pad swage connector, coupled to a cable and a pad, according to an exemplary embodiment.

FIG. 5 is a front view of a conductive pad swage connector 500 coupled to a cable 502 and a pad 504, according to an exemplary embodiment. The connector 500 includes a terminal spade 506 and a clearance set sleeve 510. The sleeve 510 is similar to the sleeve 210, and secures the connector 500 to the cable 502. The terminal spade 506 is generally flat, and includes an opening (not shown) in which a securing mechanism 516 is position for securing the terminal spade 506 to the pad 504.

Figure 6:
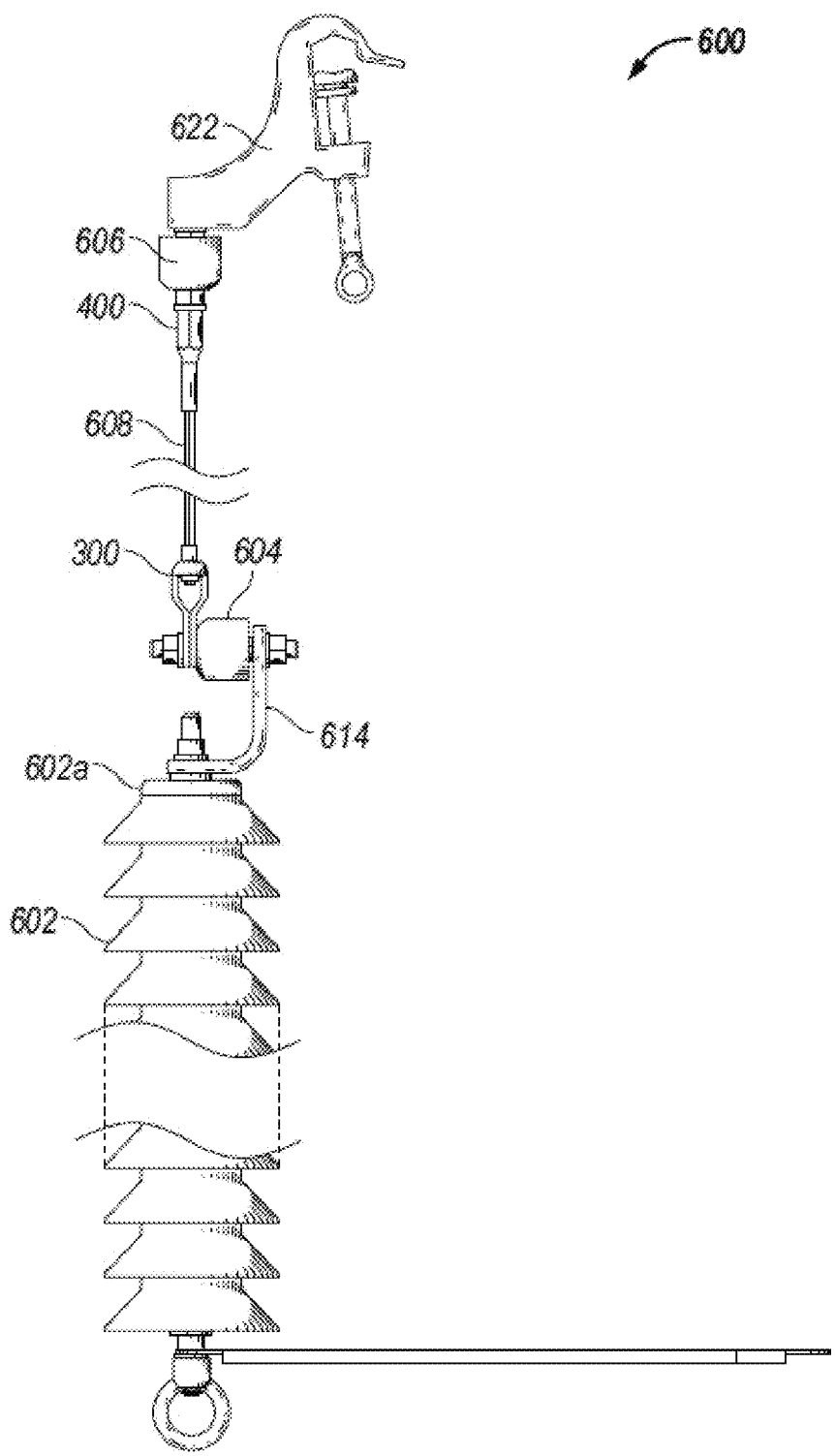
FIG. 6 is a side view of a dual disconnector-arrestor system, according to another exemplary embodiment.

FIG. 6 is a side view of a dual disconnector-arrestor system 600, according to an exemplary embodiment. The dual disconnector-arrestor system 600 includes a surge arrestor 602, disconnectors 604, 606, and a line lead 608. One end 602a of the surge arrestor 602 is coupled to the disconnector 604 by a conductive L-shaped conductive plate 614. The disconnector 604 is coupled to the line lead 608 by the conductive ball swage and shackle connector 300 (FIG. 3). The line lead 608 is also coupled to the disconnector 606 by the conductive threaded swage connector 400 (FIGS. 4A-4B). The disconnector 606 is coupled directly to a line clamp 622, and the line clamp 622 can further be connected to a distribution or transmission line (not shown). Upon actuation and separation of the disconnectors 604, 606, the line lead 608 coils upon itself and separates entirely from the system 600.

Figure 7:
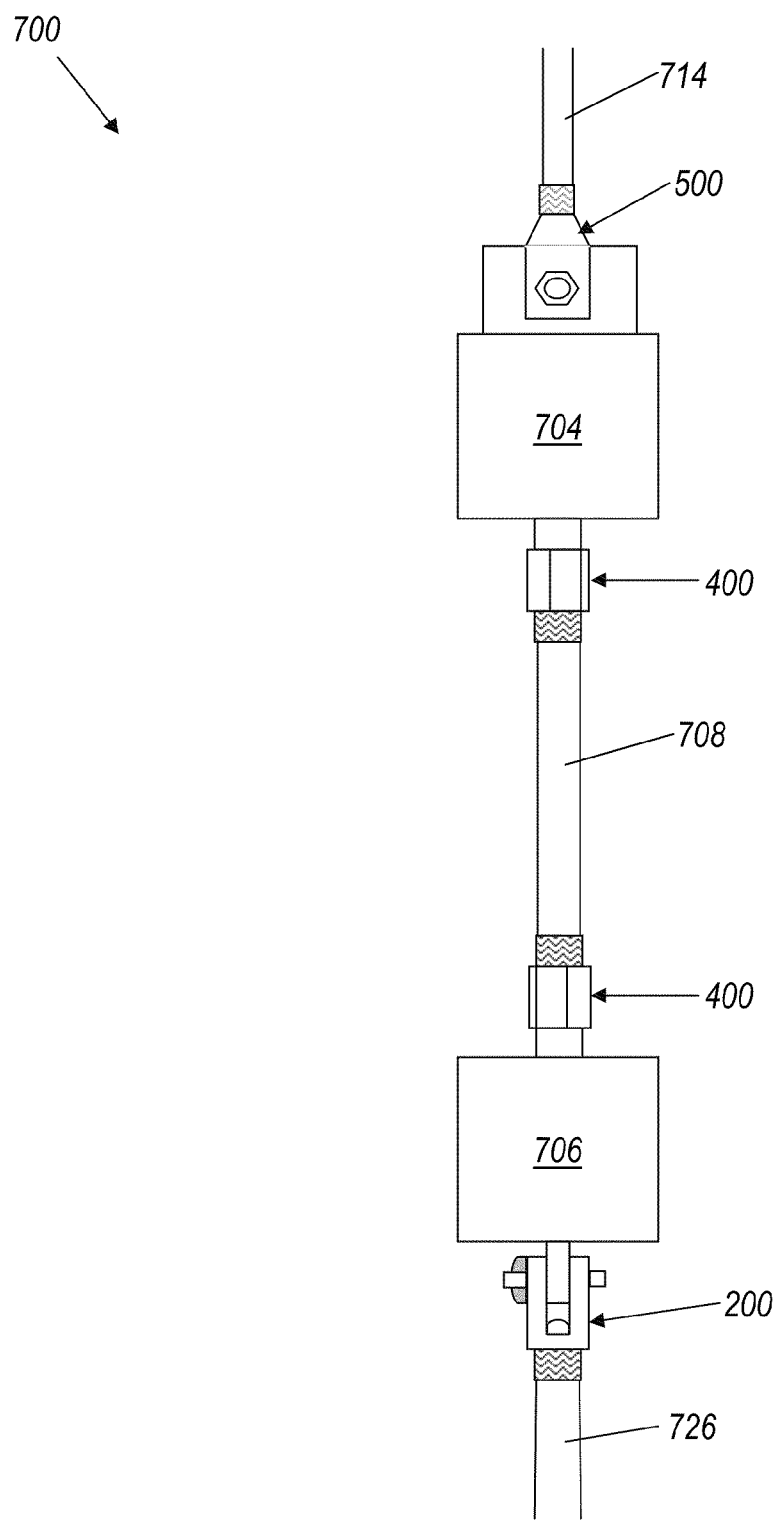
FIG. 7 is a front view of a dual disconnector system, according to an exemplary embodiment.

FIG. 7 is a front view of a dual disconnector system 700, according to an exemplary embodiment. The dual disconnector system 700 includes two disconnectors 704, 706, and a high strength stainless steel line lead 708. The disconnector 704 is coupled to a cable 714 by the pad swage connector 500 (FIG. 5). The disconnector 704 is also coupled to the line lead 708 by the threaded swage connector 400 (FIG. 400). The disconnector 706 is coupled to an opposite end of the line lead 708 by another threaded swage connector 400 (FIG. 400). The disconnector 706 is further coupled to a cable 726 by the ball swage and shackle connector 200 (FIG. 2).

Figure 8:
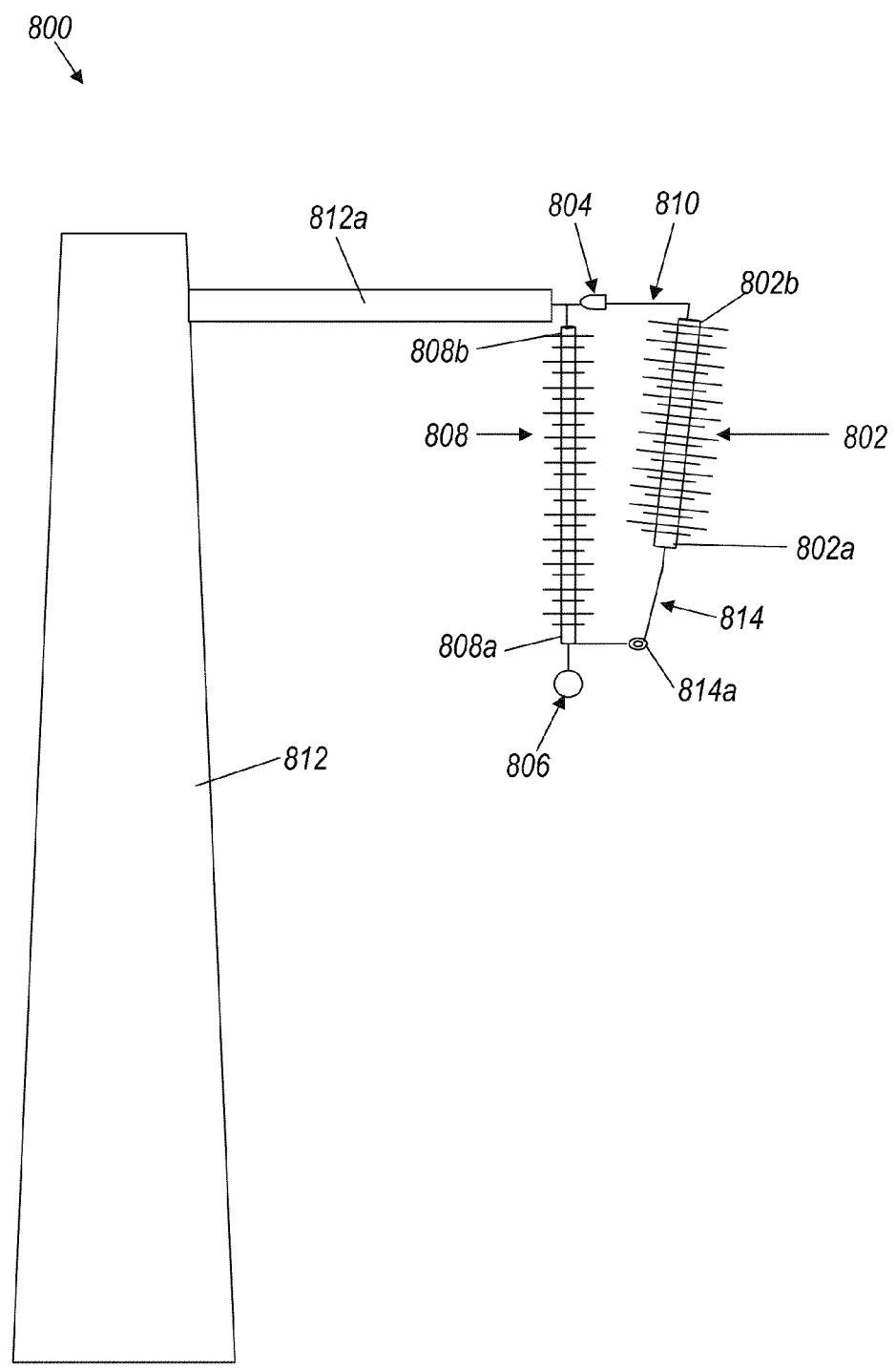
FIG. 8 is a side view of a line protection system for transmission applications, according to an exemplary embodiment.

FIG. 8 is a side view of a line protection system for transmission applications 800, according to an exemplary embodiment. The line protection system for transmission applications 800 includes a surge arrestor 802, a disconnector 804, a transmission line conductor 806, an insulator 808, and a line lead 810. The surge arrestor 802 can be any surge arrestor suitable for transmission line protection. The line lead 810 is a high strength cable. The insulator 808 is suspended from a crossarm 812a extending from a transmission tower 812. The transmission line conductor 806 is coupled to a bottom end 808a of the insulator 808. A bottom end 802a of the surge arrestor 802 is coupled to the insulator 808 by a rigid mechanical support 814 having a hinge point 814a. A top end 802b of the surge arrestor 802 is coupled to the disconnector 804 by the line lead 810. The disconnector 804 is coupled to a top end 808b of the insulator 808, and thereby the surge arrestor 802 is parallel to the insulator 808. When a high voltage condition occurs, such as a lightning strike, the disconnector 804 is actuated and separates. As a result, the surge arrestor 802 is electrically separated from the system for transmission applications 800.

Figure 9:
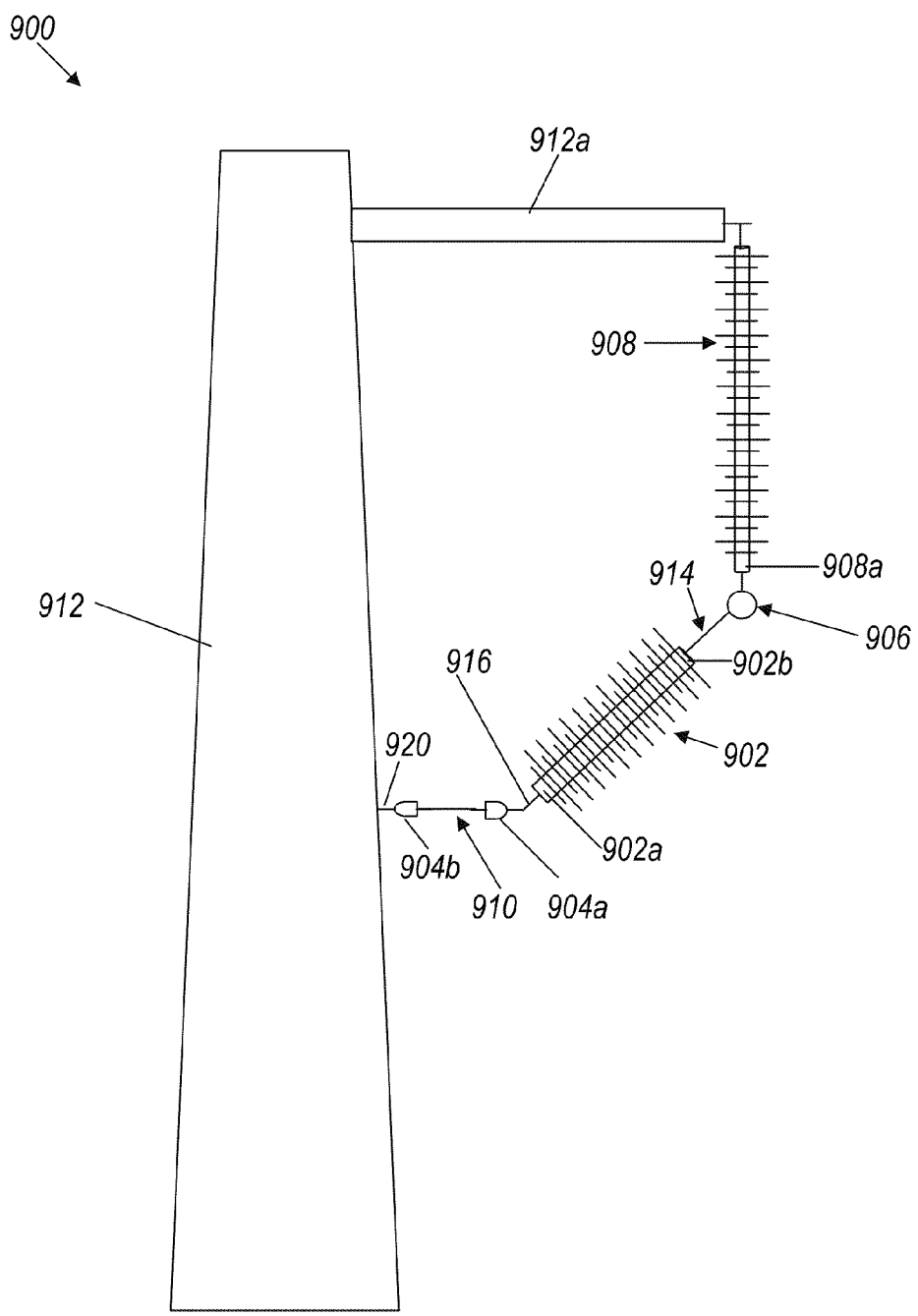
FIG. 9 is a side view of a line protection system for transmission applications, according to another exemplary embodiment.

FIG. 9 is a side view of a line protection system for transmission applications 900, according to another exemplary embodiment. The line protection system for transmission applications 900 includes a surge arrestor 902, disconnectors 904a, 904b, a transmission line conductor 906, an insulator 908, and a line lead 910. The surge arrestor 902 can be any surge arrestor suitable for transmission line protection. The line lead 910 is a high strength cable. The insulator 908 is suspended from a crossarm 912a extending from a transmission tower 912. The transmission line conductor 906 is coupled to a bottom end 908a of the insulator 908. The transmission line conductor 906 is coupled to a top end 902b of the surge arrestor 902 by a high strength cable 914. A bottom end 902a of the surge arrestor 902 is coupled to the disconnector 904a by a cable 916. The disconnector 904a is coupled to the disconnector 904b by the line lead 910. The disconnector 904b is coupled to the transmission tower 912 by a cable 920. When a high voltage condition occurs, such as a lightning strike, the disconnectors 904a, 904b are actuated and separate. As a result, the line lead 910 is separated (not shown) from the system for transmission applications 900 and coils upon itself, and falls to the surface below.

Therefore, the present invention is well adapted to attain the ends and advantages mentioned as well as those that are inherent therein. The particular embodiments disclosed above are illustrative only, as the present invention may be modified and practiced in different but equivalent manners apparent to those having ordinary skill in the art having the benefit of the teachings herein. Having described some exemplary embodiments of the present invention, it is believed that the use of alternate conductive connector configurations is within the purview of those having ordinary skill in the art. In addition, the connector configurations may be used in other power applications, such as in distribution power delivery and power transmission applications. While numerous changes may be made by those having ordinary skill in the art, such changes are encompassed within the spirit of this invention as defined by the appended claims. It is therefore evident that the particular illustrative embodiments disclosed above may be altered or modified and all such variations are considered within the scope and spirit of the present invention as defined by the claims below. The terms in the claims have their plain, ordinary meaning unless otherwise explicitly and clearly defined by the patentee.

We claim:

1. A line protection system, comprising:
   a surge arrestor;
   a first disconnector coupled to the surge arrestor;
   a line lead having a first end and a second end, the first end of the line lead coupled to the first disconnector; and
   a second disconnector coupled to the second end of the line lead such that the first disconnector, the line lead, and the second disconnector are connected in series, whereby exposure to a high voltage condition causes the line lead to disconnect at the first disconnector and the second disconnector thereby causing the line lead to drop to a surface below the line protection system.

2. The line protection system of claim 1, wherein the first end of the line lead is coupled to a first conductive connector of the first disconnector.

3. The line protection system of claim 2, wherein the first conductive connector is selected from the group consisting of ball swage and shackle connectors, threaded swage connectors, and pad swage connectors.

4. The line protection system of claim 1, wherein the second end of the line lead is coupled to a second conductive connector of the second disconnector.

5. The line protection system of claim 4, wherein the second conductive connector is selected from the group consisting of ball swage and shackle connectors, threaded swage connectors, and pad swage connectors.

6. The line protection system of claim 1, wherein the second disconnector is coupled to a distribution line.

7. The line protection system of claim 1, wherein the line lead has a tensile strength of greater than about 2500 pounds per square inch.

8. The line protection system of claim 1, wherein the line lead is constructed of a material selected from the group consisting of stranded copper, aluminum, and stainless steel.

9. A line protection system, comprising:
   a surge arrestor;
   a first disconnector coupled to the surge arrestor;
   a line lead having a first end and a second end, the first end of the line lead coupled to the first disconnector; and
   a second disconnector coupled to the second end of the line lead wherein the first disconnector, the line lead, and the second disconnector are connected in series, wherein the line lead comprises a high strength cable, wherein the line protection system does not comprise a shunt bypass assembly, and
   whereby exposure to a high voltage condition causes the line lead to disconnect at the first disconnector and the second disconnector thereby causing the line lead to drop to a surface below the line protection system.

10. The line protection system of claim 9, wherein the first end of the line lead is coupled to a first conductive connector of the first disconnector.

11. The line protection system of claim 10, wherein the first conductive connector is selected from the group consisting of ball swage and shackle connectors, threaded swage connectors, and pad swage connectors.

12. The line protection system of claim 9, wherein the line lead has a tensile strength of greater than about 2500 pounds per square inch.

13. The line protection system of claim 9, wherein the second disconnector is coupled to a transmission tower.

14. A line protection system, comprising:
    a surge arrestor;
    a first disconnector coupled to the surge arrestor by a first conductive connector;
    a line lead having a first end and a second end, the first end of the line lead coupled to the first disconnector by a second conductive connector; and
    a second disconnector coupled to the second end of the line lead such that the first disconnector, the line lead, and the second disconnector are connected in series, whereby exposure to a high voltage condition causes the line lead to disconnect at the first disconnector and the second disconnector thereby causing the line lead to drop to a surface below the line protection system.

15. The line protection system of claim 14, wherein the line protection system does not include a shunt bypass assembly.

16. The line protection system of claim 14, wherein the first conductive connector is selected from the group consisting of ball swage and shackle connectors, threaded swage connectors, and pad swage connectors.

17. The line protection system of claim 14, wherein the second conductive connector is selected from the group consisting of ball swage and shackle connectors, threaded swage connectors, and pad swage connectors.

18. The line protection system of claim 14, wherein the second disconnector is coupled to a transmission tower.

19. The line protection system of claim 14, wherein the line lead has a tensile strength of greater than about 2500 pounds per square inch.

20. The line protection system of claim 14, wherein the line lead is constructed of a material selected from the group consisting of stranded copper, aluminum, and stainless steel.

* * * * *